United States Patent
Tuers et al.

(10) Patent No.: US 9,459,955 B2
(45) Date of Patent: Oct. 4, 2016

(54) SYSTEM AND METHOD TO SCRAMBLE DATA BASED ON A SCRAMBLE KEY

(75) Inventors: Daniel Edward Tuers, Kapaa, HI (US); Steven Cheng, Milpitas, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 632 days.

(21) Appl. No.: 13/479,442

(22) Filed: May 24, 2012

(65) Prior Publication Data

US 2013/0315397 A1  Nov. 28, 2013

(51) Int. Cl.
 *H04K 1/04* (2006.01)
 *G06F 11/10* (2006.01)

(52) U.S. Cl.
 CPC ........ *G06F 11/1012* (2013.01); *G11B 2220/60* (2013.01)

(58) Field of Classification Search
 CPC ................... G06F 11/1012; G06F 2201/2107; G11B 2220/60; H04N 7/1675
 See application file for complete search history.

(56) References Cited

U.S. PATENT DOCUMENTS

| | | | | |
|---|---|---|---|---|
| 3,701,094 A * | 10/1972 | Howell | ......................... | 714/762 |
| 5,285,497 A * | 2/1994 | Thatcher, Jr. | ........... | G06T 9/005 |
| | | | | 348/425.5 |
| 5,825,807 A * | 10/1998 | Kumar | ......................... | 375/130 |
| 5,949,796 A * | 9/1999 | Kumar | ......................... | 370/529 |
| 6,226,742 B1 * | 5/2001 | Jakubowski | .......... | H04L 9/0625 |
| | | | | 380/37 |
| 6,363,485 B1 * | 3/2002 | Adams et al. | ................ | 713/186 |
| 6,457,126 B1 * | 9/2002 | Nakamura et al. | .......... | 713/166 |
| 6,918,080 B2 * | 7/2005 | Kikuchi | ............. | G11B 27/3027 |
| | | | | 375/E7.211 |
| 7,158,058 B1 | 1/2007 | Yu | | |
| 7,213,157 B2 * | 5/2007 | Dariel | .......................... | 713/189 |
| 7,380,120 B1 * | 5/2008 | Garcia | ................ | G06F 21/6209 |
| | | | | 380/200 |
| 7,512,760 B2 | 3/2009 | Takami | | |
| 7,761,465 B1 * | 7/2010 | Nonaka et al. | ................ | 707/770 |
| 8,180,987 B2 * | 5/2012 | Hellman et al. | ............... | 711/163 |
| 8,220,039 B2 * | 7/2012 | Gonzalez et al. | ................ | 726/9 |
| 8,234,505 B2 * | 7/2012 | Anderson | ...................... | 713/193 |
| 8,301,715 B2 * | 10/2012 | Ittah | ........................ | G06F 21/79 |
| | | | | 709/203 |
| 8,438,647 B2 * | 5/2013 | Jevans | ..................... | G06F 21/32 |
| | | | | 713/165 |
| 8,713,245 B2 * | 4/2014 | Frost | ................... | G06F 11/1068 |
| | | | | 711/103 |
| 8,788,910 B1 * | 7/2014 | Northcott | ....................... | 714/773 |
| 8,793,556 B1 * | 7/2014 | Northcott et al. | ............. | 714/773 |
| 8,972,824 B1 * | 3/2015 | Northcott et al. | ............. | 714/773 |
| 2001/0038694 A1 * | 11/2001 | Senshu | ................... | G11B 19/04 |
| | | | | 380/201 |
| 2001/0050926 A1 * | 12/2001 | Kumar | .......................... | 370/529 |
| 2002/0006093 A1 * | 1/2002 | Kobayashi | ....... | G11B 20/00086 |
| | | | | 369/53.21 |
| 2002/0018561 A1 * | 2/2002 | Emelko | .................... | H04L 9/304 |
| | | | | 380/28 |

(Continued)

FOREIGN PATENT DOCUMENTS

WO       2012117263 A1    9/2012

OTHER PUBLICATIONS

International Search Report and Written Opinion for International Application No. PCT/US2013/038879, dated Sep. 2, 2013, 12 pages.

(Continued)

*Primary Examiner* — Peter Poltorak

(74) *Attorney, Agent, or Firm* — Toler Law Group, PC

(57) ABSTRACT

A data storage device includes a memory and a controller. The controller is configured to scramble data using a scramble key to produce scrambled data and to encode the scramble key to produce an encoded scramble key. The controller is further configured to store the encoded scramble key and the scrambled data to the memory.

29 Claims, 4 Drawing Sheets

(56) References Cited

U.S. PATENT DOCUMENTS

| | | | |
|---|---|---|---|
| 2002/0024904 A1* | 2/2002 | Kobayashi | G11B 7/007 369/52.1 |
| 2002/0048365 A1* | 4/2002 | Namiki et al. | 380/201 |
| 2002/0048367 A1* | 4/2002 | Maillard | H04N 5/913 380/239 |
| 2003/0061500 A1* | 3/2003 | Mimura | G11B 20/00086 713/193 |
| 2003/0066014 A1* | 4/2003 | Van Dijk | G11B 20/18 714/774 |
| 2003/0070082 A1* | 4/2003 | Nimura | G11B 20/00086 713/193 |
| 2003/0099140 A1 | 5/2003 | Payne et al. | |
| 2003/0135798 A1 | 7/2003 | Katayama et al. | |
| 2003/0206631 A1* | 11/2003 | Candelore | H04N 5/913 380/210 |
| 2004/0030909 A1* | 2/2004 | Sako | G11B 20/00086 713/193 |
| 2004/0073852 A1* | 4/2004 | Sako | G11B 20/00086 714/48 |
| 2004/0096189 A1* | 5/2004 | Sako et al. | 386/94 |
| 2004/0122829 A1* | 6/2004 | Sakurai | G06F 21/10 |
| 2004/0225827 A1* | 11/2004 | Yokota | G11C 7/16 711/103 |
| 2005/0114689 A1* | 5/2005 | Strom et al. | 713/193 |
| 2005/0154907 A1* | 7/2005 | Han | G06F 21/10 713/193 |
| 2005/0160053 A1* | 7/2005 | Okamoto | G06F 21/10 705/67 |
| 2005/0182948 A1* | 8/2005 | Ducharme | G06F 21/10 713/189 |
| 2006/0101524 A1* | 5/2006 | Weber | H04L 63/0428 726/27 |
| 2006/0224852 A1* | 10/2006 | Kottomtharayil | G06F 3/0605 711/170 |
| 2007/0201702 A1* | 8/2007 | Hendricks | G06F 21/10 380/282 |
| 2008/0063209 A1* | 3/2008 | Jaquette et al. | 380/284 |
| 2008/0152142 A1 | 6/2008 | Buer et al. | |
| 2008/0158948 A1 | 7/2008 | Sharon et al. | |
| 2008/0165973 A1* | 7/2008 | Gavillan | G06F 21/6209 380/278 |
| 2009/0052670 A1* | 2/2009 | You et al. | 380/277 |
| 2009/0059751 A1* | 3/2009 | Ikeda et al. | 369/53.17 |
| 2009/0083485 A1 | 3/2009 | Cheng | |
| 2009/0122610 A1 | 5/2009 | Danon et al. | |
| 2009/0150637 A1 | 6/2009 | Hattori et al. | |
| 2009/0204824 A1 | 8/2009 | Lin et al. | |
| 2009/0259856 A1* | 10/2009 | Tsuruta | G06F 21/52 713/189 |
| 2010/0251074 A1* | 9/2010 | Chu et al. | 714/773 |
| 2011/0035645 A1 | 2/2011 | Yang | |
| 2011/0246791 A1* | 10/2011 | Kambayashi | G06F 12/1408 713/193 |
| 2012/0005409 A1 | 1/2012 | Yang | |
| 2012/0023384 A1* | 1/2012 | Naradasi | G06F 11/1012 714/763 |
| 2012/0284589 A1 | 11/2012 | Kim et al. | |
| 2012/0290899 A1* | 11/2012 | Cideciyan | G06F 11/1072 714/773 |

OTHER PUBLICATIONS

Preliminary Report on Patentability issued Nov. 25, 2014 in International Application No. PCT/US2013/038879, 7 pages.

* cited by examiner

SYSTEM AND METHOD TO SCRAMBLE DATA BASED ON A SCRAMBLE KEY

FIELD OF THE DISCLOSURE

The present disclosure is generally related to scrambling data.

BACKGROUND

Non-volatile data storage devices, such as universal serial bus (USB) flash memory devices or removable storage cards, have allowed for increased portability of data and software applications. Flash memory devices can enhance data storage density by storing multiple bits in each flash memory cell. For example, Multi-Level Cell (MLC) flash memory devices provide increased storage density by storing 3 bits per cell, 4 bits per cell, or more. Although increasing the number of bits per cell and reducing device feature dimensions may increase a storage density of a memory device, a bit error rate of data stored at the memory device may also increase.

Error correction coding (ECC) is often used to correct errors that occur in data read from a memory device. Prior to storage, data may be encoded by an ECC encoder to generate redundant information (e.g. "parity bits") that may be stored with the data as an ECC codeword. As more parity bits are used, an error correction capacity of the ECC increases and a number of bits required to store the encoded data also increases.

Flash memory devices may be sensitive to repeated patterns stored in a flash block (i.e., a portion of a flash memory). A scrambler is often used to modify a data pattern stored in the flash block to reduce pattern sensitivity. The scrambler may use a scramble key and apply a logical operation, such as an exclusive OR (XOR), to the data pattern to modify the data pattern.

Descrambling of data may depend on accurate retrieval of the scramble key from the flash block. Although the scramble key may be protected by the ECC parity bits, performing de-scrambling after ECC decoding may increase a delay in reading data from the flash memory device.

SUMMARY

Data is scrambled based on a scramble key to produce scrambled data. The scramble key is separately encoded for storage with the scrambled data. By scrambling the data based on the scramble key and separately encoding the scramble key for storage with the scrambled data, stronger error correction protection of the scramble key may be achieved. In addition, decoding of the scramble key may be performed independent of and prior to, or in parallel with, decoding the scrambled data, which may reduce latency during a data read operation.

DETAILED DESCRIPTION

Figure 1:
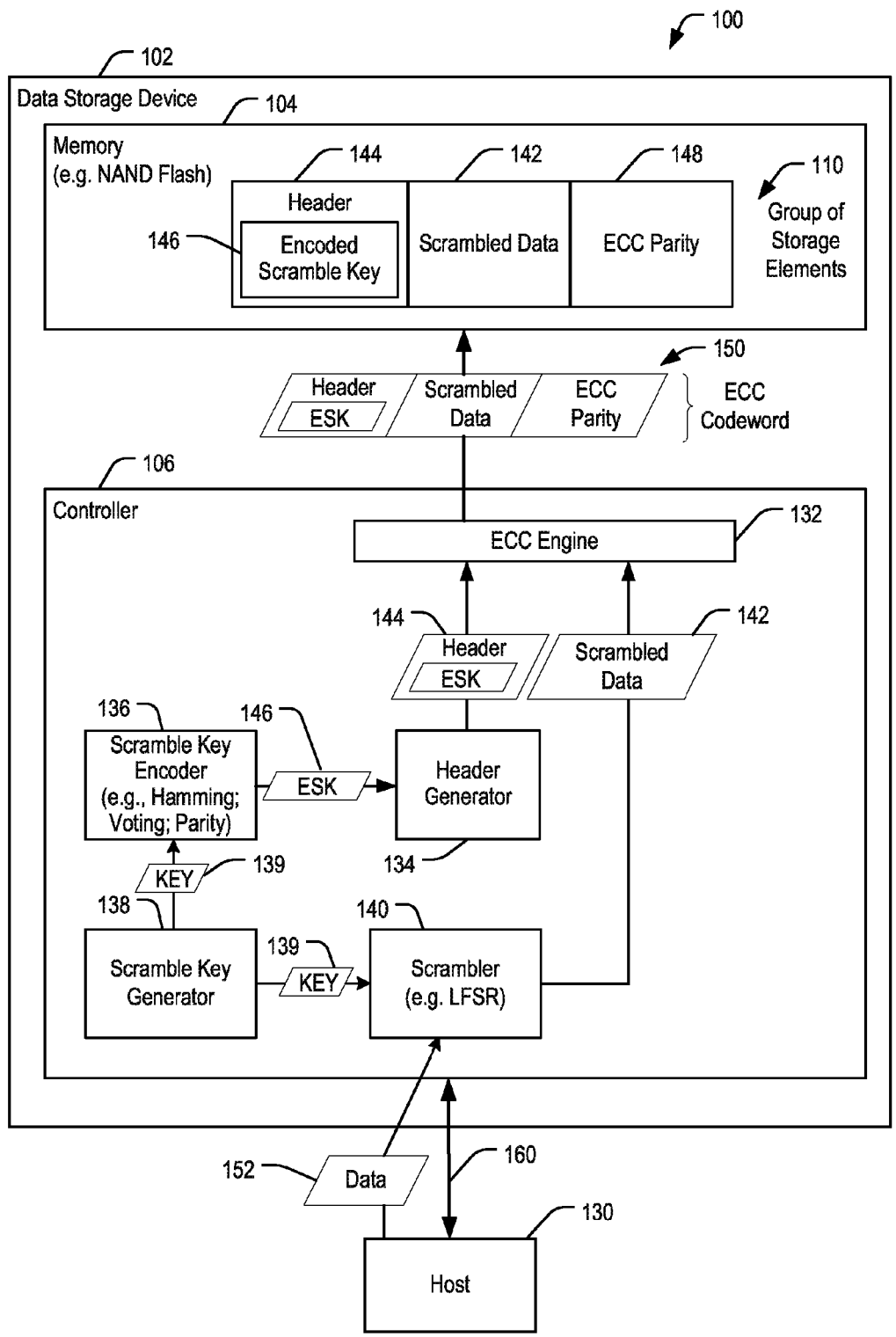
FIG. 1 is a block diagram of a first particular illustrative embodiment of a system including a data storage device configured to scramble data prior to storage at a memory.

Referring to FIG. 1, a particular illustrative embodiment of a system including a data storage device 102 configured to scramble data is depicted and generally designated 100. The system 100 includes the data storage device 102 coupled to a host device 130 via a bus 160. The data storage device 102 includes a memory 104 coupled to a controller 106. The controller 106 is configured to scramble data based on a scramble key and to separately encode the scramble key for storage with the scrambled data.

The data storage device 102 may be a memory card, such as a Secure Digital SD® card, a microSD® card, a miniSD.™ card (trademarks of SD-3C LLC, Wilmington, Del.), a MultiMediaCard.™ (MMC.™) card (trademark of JEDEC Solid State Technology Association, Arlington, Va.), or a CompactFlash® (CF) card (trademark of SanDisk Corporation, Milpitas, Calif.). As another example, the data storage device 102 may be embedded memory in the host device 130, such as eMMC® (trademark of JEDEC Solid State Technology Association, Arlington, Va.) and eSD memory, as illustrative examples.

The host device 130 may be configured to provide data to be stored at the memory 104 or to request data to be read from the memory 104. For example, the host device 130 may include a mobile telephone, a music or video player, a gaming console, an electronic book reader, a personal digital assistant (PDA), a computer, such as a laptop computer, a notebook computer, or a tablet, any other electronic device, or any combination thereof.

The memory 104 may be a non-volatile memory of a flash device, such as a NAND flash device, a NOR flash device, or any other type of flash device. The memory 104 includes a group of storage elements 110, such as a page, a wordline, or a block, as illustrative examples. The memory 104 may be configured to receive an error correction code (ECC) codeword 150 from the controller 106 and to store the ECC codeword 150 in the group of storage elements 110.

The controller 106 is configured to receive data and instructions from and to send data to the host device 130 while the data storage device 102 is operatively coupled to the host device 130. The controller 106 is further configured to send data and commands to the memory 104 and to receive data from the memory 104. For example, the controller 106 is configured to send data and a write command to instruct the memory 104 to store the data, such as the ECC codeword 150, to a specified address, such as addresses corresponding to the group of storage elements 110. As another example, the controller 106 is configured to send a read command to read data from a specified address of the memory 104.

The controller 106 includes an ECC engine 132, a header generator 134, a scramble key encoder 136, a scramble key generator 138, and a scrambler 140. The controller 106 is configured to receive data, such as data 152 from the host device 130, and to scramble the data 152 in the scrambler 140 using a scramble key 139 to produce scrambled data 142.

The scramble key 139 is provided to the scrambler 140 by the scramble key generator 138. The scramble key 139 may be chosen by the scramble key generator 138 randomly. Alternatively, the scramble key 139 may be chosen or provided to the scramble key generator 138, such as by using a table lookup of keys. The table lookup of keys may be defined by firmware (e.g., executable instructions that are executed by a processor (not shown) in the controller 106). The table lookup of keys may use a logical address translated to a pseudo-random key to prevent the scramble keys from being generated in a sequential pattern.

The scrambler 140 may be configured to scramble data, such as the data 152 received from the host device 130. The scrambler 140 may be configured to scramble the data 152 during a data write operation. The scrambler 140 may include a linear feedback shift register (LFSR) configured to generate a pseudo-random scrambling word based on the scramble key 139 to scramble the data 152 to produce the scrambled data 142. For example, the scrambler 140 may receive the data 152 from the host device 130 and the scramble key 139 from the scramble key generator 138, load the scramble key 139 to the LFSR, and cycle resulting data through the LFSR to produce a pseudo-random scrambling word. A logical operation, such as an exclusive OR (XOR) of the data and the pseudo-random scrambling word may be used to generate the scrambled data 142.

In a specific implementation, a NAND data latch circuit (i.e., NAND XDL) may be used in combination with the LFSR to "expand" the LFSR by one bit. For example, if the scramble key 139 is a 6-bit key, five of those bits may be used as an initial value to be loaded in the LFSR. The sixth bit of the scramble key 139 may be examined by logic at the memory 104. If a value of the sixth bit=1, the memory 104 may flip all bits in the scrambled data 142 and store the result. If the value of the sixth bit=0, the memory may not flip the bits in the scrambled data 142 and store the result. Although described as a 6-bit key, in other implementations, the scramble key 139 may be any size.

The header generator 134 may be configured to generate a header 144 corresponding to the scrambled data 142 for storage with the scrambled data 142 in the memory 104. For example, the header 144 may include metadata related to the scrambled data 142. An encoded scramble key 146 is also included in the header 144.

The scramble key encoder 136 may be configured to encode a copy of the scramble key 139 received from the scramble key generator 138 to produce the encoded scramble key 146. For example, the scramble key encoder 136 may include an encoder configured to apply a Hamming code to encode the scramble key 139 and to enable error correction of the encoded scramble key 146. For example, a sum of positions of erroneous parity bits may identify an erroneous bit. To illustrate, if parity bits in positions 1, 2, and 8 of a Hamming codeword indicate an error, then bit 1+2+8=11 of the codeword is in error. As another example, the scramble key encoder 136 may be configured to encode the scramble key to enable error correction using parity bits, such as by using a low-power "mini" ECC encoder. To illustrate, the "mini" ECC encoder may include a Reed Solomon encoder that generates three to five parity bits to enable correction of one to two bit errors. As a further example, the scramble key encoder 136 may be configured to encode the scramble key via a repetition encoding to enable error correction using a voting scheme, such as a majority voting scheme. For example, each bit of the scramble key 139, or the entire scramble key 139, may be repeated multiple times. For each bit of the scramble key 139, a comparison of all corresponding bit values may be performed, and if the corresponding bit values are different, then a bit value that appears most often may be selected. The encoded scramble key 146 may be decodable independent of the scrambled data 142 as described in further detail with respect to FIG. 2.

The ECC engine 132 is configured to receive data to be stored to the memory 104 and to generate a codeword, such as the ECC codeword 150. For example, the ECC engine 132 may include an encoder configured to encode data using an ECC encoding scheme, such as a Reed Solomon encoder, a Bose-Chaudhuri-Hocquenghem (BCH) encoder, a low-density parity check (LDPC) encoder, a Turbo Code encoder, an encoder configured to encode one or more other ECC encoding schemes, or any combination thereof. The ECC engine 132 may include a decoder configured to decode data read from the memory 104 to detect and correct, up to an error correction capability of the ECC scheme, any bit errors that may be present in the data.

The ECC engine 132 may be configured to receive the scrambled data 142 and the header 144 including the encoded scramble key 146 and encode the scrambled data 142 and the header 144 including the encoded scramble key 146 to produce the ECC parity bits 148 to form the ECC codeword 150. The ECC parity bits 148 provide error correction for the scrambled data 142 and also for the encoded scramble key 146.

During operation, the host device 130 may provide the data 152 to be stored in the memory 104. The data 152 may be scrambled by the scrambler 140 using the scramble key 139 produced by the scramble key generator 138. The scrambled data 142 along with the header 144 including the encoded scramble key 146 produced by the scramble key encoder 136 may be received by the ECC engine 132. The ECC engine 132 may encode the scrambled data 142, the header 144 (and the encoded scramble key 146) and produce the ECC codeword 150. The ECC codeword 150 may be stored in the group of storage elements 110 in the memory 104.

By scrambling data based on a scramble key and separately encoding the scramble key for storage with the scrambled data, stronger error correction protection may be achieved. In addition, subsequent decoding of the scramble key may be performed independent of the scrambled data, which may reduce latency during an error correction code decoding operation as described in further detail with respect to FIG. 2.

Figure 2:
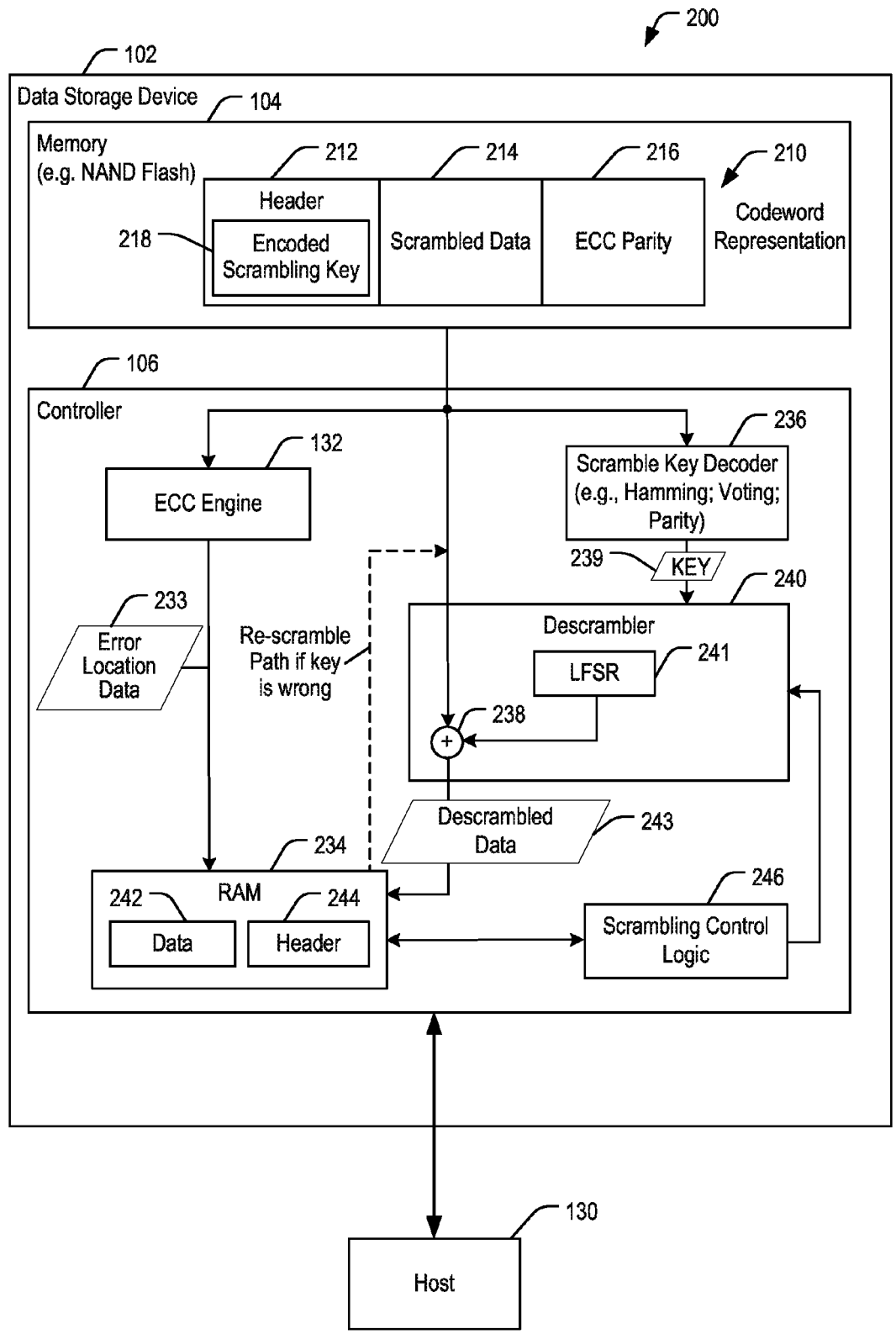
FIG. 2 is a block diagram of a second particular illustrative embodiment of a system including the data storage device of FIG. 1 configured to read scrambled data from the memory.

Referring to FIG. 2, a particular illustrative embodiment of a system including a data storage device configured to read scrambled data is depicted and generally designated 200. The system 200 may be configured to retrieve stored data and includes the data storage device 102 coupled to the host device 130. The data storage device 102 includes the memory 104 and the controller 106.

As explained above with respect to FIG. 1, the memory 104 may be configured to store the ECC codeword 150 (not shown) in the group of storage elements 110 (not shown). Over time, the stored ECC codeword 150 may be susceptible to errors, resulting in a codeword representation 210. The memory 104 is configured to store the codeword representation 210. For example, the codeword representation 210 may include a representation of a header 212, a representation of scrambled data 214, and a representation of ECC parity bits 216. The representation of the header 212 may include a representation of an encoded scramble key 218.

The controller 106 is configured to send a read command to read data, such as the codeword representation 210, from a specified address of the memory 104 (e.g., the group of storage elements 110 of FIG. 1). The controller 106 includes the ECC engine 132, a scramble key decoder 236, a descrambler 240, a random access memory (RAM) 234, and scrambling control logic 246. The controller 106 is configured to receive data, such as the codeword representation 210 from the memory 104, to decode the representation of the encoded scramble key 218 via the scramble key decoder 236 to produce a scramble key 239, and to descramble the representation of scrambled data 214 based on the scramble key 239 to produce a descrambled representation of data 243.

The scramble key decoder 236 may be configured to decode a copy of the representation of the encoded scramble key 218 received from the memory 104 to produce the scramble key 239. The representation of the encoded scramble key 218 may be decodable independent of the representation of scrambled data 214. For example, the scramble key decoder 236 may include a decoder (e.g., a hardware decoder) configured to apply a Hamming code to decode the representation of the encoded scramble key 218. As another example, the scramble key decoder 236 may be configured to decode the representation of the encoded scramble key 218 using parity bits. As a further example, the scramble key decoder 236 may be configured to decode the representation of the encoded scramble key 218 via a repetition encoding using a voting scheme, such as a majority voting scheme. The scramble key 239 may be the scramble key 139 of FIG. 1 or may be another scramble key as described in further detail below.

The descrambler 240 may be configured to descramble data, such as the representation of scrambled data 214 received from the memory 104. The descrambler 240 may be configured to descramble the representation of scrambled data 214 during a data read operation. The descrambler 240 may include a linear feedback shift register (LFSR) 241 configured to generate a pseudo-random scrambling word based on the scramble key 239 to scramble the representation of scrambled data 214 and produce the descrambled representation of data 243. For example, the descrambler 240 may receive the representation of scrambled data 214 from the memory 104 and the scramble key 239 from the scramble key decoder 236, load the scramble key 239 to the LFSR 241, and cycle resulting data through the LFSR 241 to produce the pseudo-random scrambling word. A logical operation, such as an exclusive OR 238 of the representation of scrambled data 214 and the pseudo-random scrambling word may be used to generate the descrambled representation of data 243. The descrambled representation of data 243 may be written to the RAM 234.

The ECC engine 132 may be configured to perform an ECC decoding operation including decoding data read from the memory 104 and generating error location data 233 corresponding to erroneous bit locations. The ECC decoding operation may be performed in parallel with the scramble key decoder 236 decoding the representation of the encoded scramble key 218 and the descrambler 240 descrambling the scramble key 239. For example, the ECC engine 132 may be configured to receive the codeword representation 210 from the memory 104 and to decode the representation of the header 212 including the encoded scramble key 218, the representation of the scrambled data 214, and the representation of the ECC parity bits 216 to produce the error location data 233. The error location data 233 is provided to the RAM 234 to correct (e.g., "flip") bits in those locations such that error correction is performed in the RAM 234. For example, the error location data 233 may be applied to the descrambled representation of data 243 written to the RAM 234 to produce an unscrambled, error corrected version of data 242 and an unscrambled, error corrected version of a header 244 including a scramble key.

If errors in the error location data 233 occur in the header 244, then a determination may be made whether the ECC corrected scramble key in the header 244 matches the scramble key 239. If the ECC corrected scramble key does not match the scramble key 239, then the scramble key decoder 236 "guessed wrong" and an erroneous scramble key was used to descramble the representation of scrambled data 214. In that case, the unscrambled, error corrected version of data 242 may be "re-scrambled" using the "wrong" key (e.g., the scramble key 239) to return the unscrambled, error corrected version of data 242 to a prior state (e.g., another scrambled representation of data 243). The other scrambled representation of data 243 may be written to the RAM 234. The other scrambled representation of data 243 may thereafter be "re-descrambled" using the "correct" key (i.e., the error corrected version of the scramble key in the header 244 in the RAM 234) to produce yet another descrambled representation of data 243. The yet another descrambled representation of data 243 may be stored in the RAM 234. Alternatively, instead of writing the other scrambled representation of data 243 to the RAM 234 after "re-scrambling", resulting in two "hops" into and out of the RAM 234, the other scrambled representation of data 243 may be "re-descrambled" "on the fly" (e.g., the re-scramble and the re-descramble can be done in one step), reducing memory copying to one hop.

To illustrate, the scramble control logic 246 may be configured to read the error corrected version of header 244 including the scramble key from the RAM 234, and compare the error corrected version of the scramble key in the header 244 to the scramble key 239 generated by the scramble key decoder 236. If the error corrected version of the scramble key in the header 244 matches the scramble key 239 generated by the scramble key decoder 236, then the unscrambled, error corrected version of data 242 is correct.

If the error corrected version of the scramble key in the header 244 does not match the scramble key 239 generated by the scramble key decoder 236, then the unscrambled, error corrected version of data 242 is incorrect and may be "re-scrambled" using the "wrong" key (e.g., the scramble key 239) to produce scrambled corrected data. For example, the scramble control logic 246 may be configured to read the (incorrectly) unscrambled, error corrected version of data 242 from the RAM 234 to be provided to the descrambler 240.

The (incorrectly) unscrambled, error corrected version of data 242 may be re-scrambled (e.g., descrambled) by the descrambler 240 using the "wrong" key to produce scrambled corrected data that may be written to the RAM 234. The scramble control logic 246 may be configured to read the scrambled corrected data and the "correct" key (i.e., the error corrected version of the scramble key in the header 244 that was decoded by the ECC engine 132) from the RAM 234 and to write the scrambled corrected data and the "correct" key to the descrambler 240. The scrambled corrected data may thereafter be descrambled by the descrambler using the "correct" key to produce another descrambled representation of data 243. The resulting descrambled representation of data 243 includes error corrected bits previously identified by the ECC engine 132 and may be stored in the RAM 234 along with the header 244.

By decoding the scramble key 239 at the scramble key decoder 236 independent of the representation of scrambled data 214, latency during an error correction code decoding operation may be reduced. For example, because the scramble key 239 is decoded and the representation of scrambled data 214 is descrambled prior to the ECC engine 132 completing decoding of the codeword representation 210, descrambling using the scramble key 239 may occur "on the fly" rather than having to wait for the error correction code decoding operation to complete.

Although the data storage device 102 of FIG. 1 illustrates encode path components and the data storage device 102 of FIG. 2 illustrates decode path components, such components, together with the scramble key encoder 136 and the scramble key decoder 236, may be implemented to re-use circuitry or other components common to both the encode path and the decode path. For example, the scrambler 140 and the descrambler 240 may be the same component and/or use circuitry or other components in common. In addition, although no RAM is illustrated in FIG. 1 for simplicity of explanation, the RAM 234 of FIG. 2 may be used to buffer data during ECC encoding of the data.

With respect to FIGS. 1 and 2, in a specific implementation, each logical page in a physical page of the memory 104 may have a scramble key. As such, if the physical page (e.g., having a size of 8 KB) stores multiple logical pages (e.g., four 2 KB logical pages), each logical page may have its own scramble key in the header, which may allow a particular logical page to be read independently. In addition, each logical page having its own scramble key may provide advantages in the event that the scramble key of a logical page cannot be determined. For example, if the scramble key cannot be determined by the firmware (e.g., executable instructions that are executed by a processor (not shown) in the controller 106) in a particular logical page, then the scramble key in an adjacent logical page in the physical page may be evaluated to make a determination regarding the scramble key for the particular logical page. For example, if the scramble key 239 cannot be determined by the firmware in the controller 106, the descrambler 240 may be configured to evaluate one or more scramble keys in one or more logical pages adjacent to the particular logical page and based on the evaluation, make a determination regarding the scramble key for the particular page.

With respect to FIG. 2, in a specific implementation, an alternative to having the "hardware" (e.g., the descrambler 240 and the scrambling control logic 246) perform a "second pass" (e.g., re-scrambling the descrambled data 243 with the "wrong" scramble key, descrambling with the "correct" scramble key, and storing the descrambled data 243 back to the RAM 234) of the descrambled data 243 after determining that the error corrected version of the scramble key in the header 244 does not match the scramble key 239 generated by the scramble key decoder 236 may be for the hardware to notify the firmware of an error in the scramble key 239 provided by the scramble key decoder 236. Thereafter, the firmware may re-read the codeword representation 210 from the memory 104 and "override" the hardware by directly providing the "correct" scramble key to the descrambler 240.

For example, the scrambling control logic 246 may be configured to detect that the scramble key 239 provided by the scramble key decoder 236 and used in the descrambler 240 is different than the error corrected version of the scramble key in the header 244 as explained above. Instead of performing the "second pass," the scrambling control logic 246 may be configured to notify a processor executing the firmware of an error in the scramble key 239 provided by the descrambler 240. The firmware may be configured to retrieve the "correct" scramble key (e.g., the error corrected version of the scramble key in the header 244) and "override" the "hardware" (including the scramble key decoder 236) by directly providing the "correct" scramble key to the descrambler 240 and bypassing the scramble key decoder 236.

Figure 3:
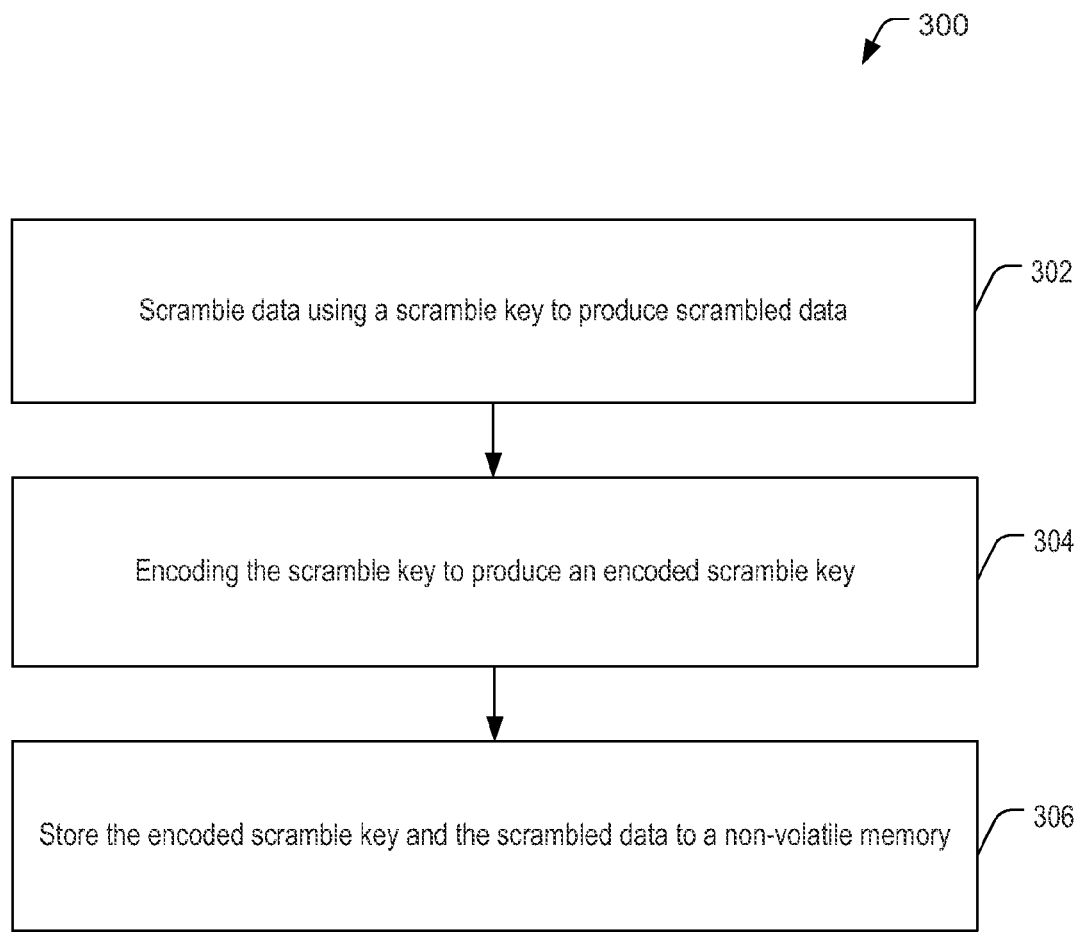
FIG. 3 is a flow chart of a first particular illustrative embodiment of a method of scrambling data.

FIG. 3 depicts a flowchart that illustrates an embodiment of a method 300 of scrambling data. The method 300 may be performed by a data storage device, such as the data storage device 102 of FIG. 1 and FIG. 2.

Data is scrambled using a scramble key to produce scrambled data, at 302. For example, the scrambler 140 of FIG. 1 may receive the data 152 from the host device 130 and the scramble key 139 from the scramble key generator 138, load the scramble key 139 to the LFSR, and cycle resulting data through the LFSR to produce a pseudo-random scrambling word. A logical operation, such as an exclusive OR of the data and the pseudo-random scrambling word, may be used to generate the scrambled data.

The scramble key is encoded to produce an encoded scramble key, at 304. For example, the scramble key encoder 136 may encode a copy of the scramble key 139 received from the scramble key generator 138 to produce the encoded scramble key 146. The scramble key encoder 136 may apply a Hamming code to encode the scramble key and to enable error correction of the encoded scramble key 146. As another example, the scramble key encoder 136 may apply parity bits to encode the scramble key and to enable error correction of the encoded scramble key 146, such as by using a low-power "mini" ECC encoder (e.g., a Reed-Solomon encoder). As a further example, the scramble key encoder 136 may encode the scramble key via a repetition encoding to enable error correction using a voting scheme, such as a majority voting scheme.

The encoded scramble key and the scrambled data are stored to a non-volatile memory of the data storage device, at 306. For example, the ECC engine 132 may encode the scrambled data 142 and the header 144 (and the encoded scramble key 146) to produce the ECC codeword 150. The ECC codeword 150 may be stored in the group of storage elements 110 in the memory 104.

The method 300 enables stronger error correction protection to be achieved by scrambling data based on a scramble key and separately encoding the scramble key for storage with the scrambled data. In addition, subsequent decoding of the scramble key may be performed independent of the scrambled data, which may reduce latency during a data read, descramble, and ECC decode operation.

Figure 4:
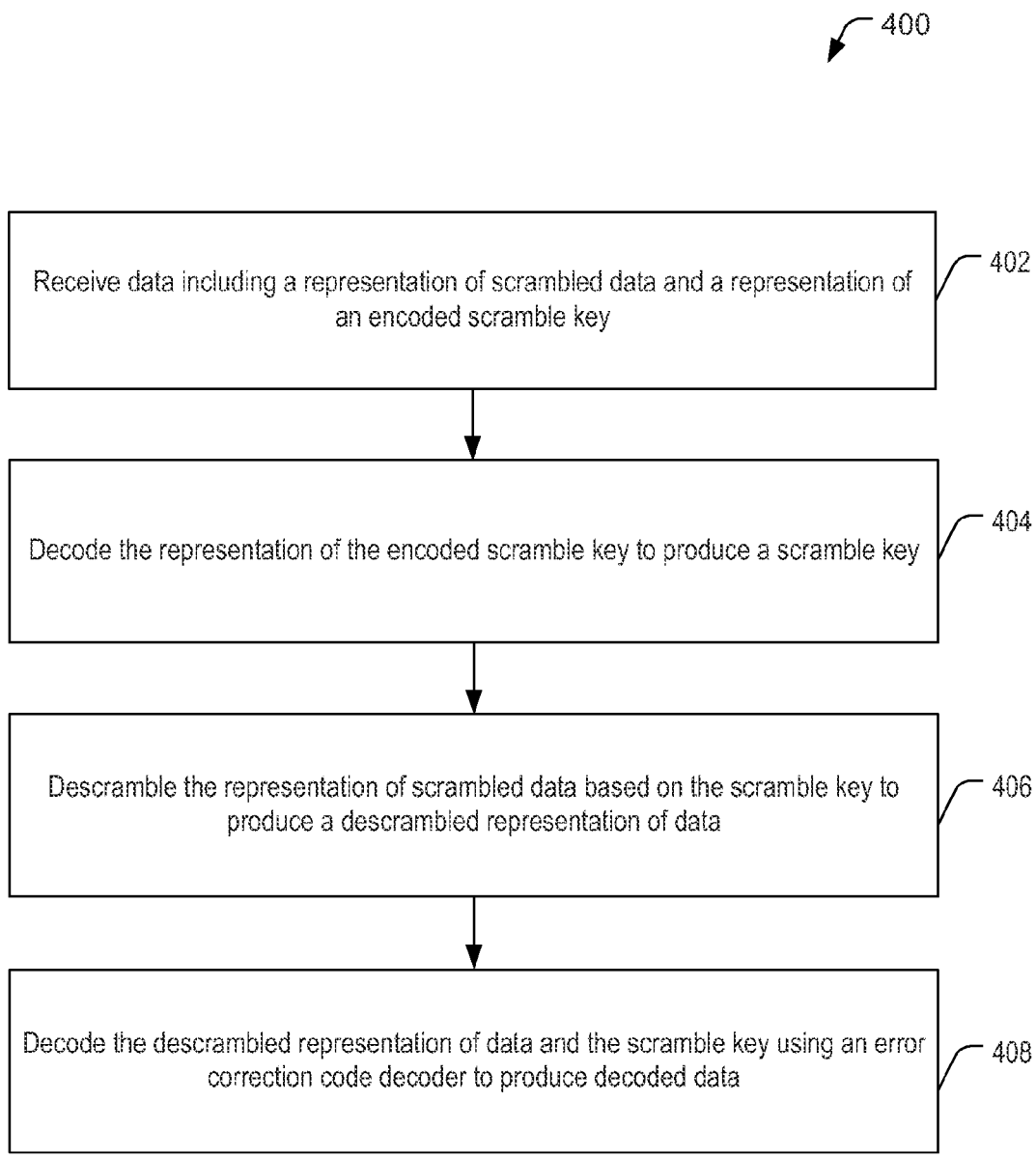
FIG. 4 is a flow chart of a second particular illustrative embodiment of a method of scrambling data.

FIG. 4 depicts a flowchart that illustrates an embodiment of a method 400 of receiving data. The method 400 may be performed by a data storage device, such as the data storage device 102 of FIG. 1 and FIG. 2.

Data is received including a representation of scrambled data and a representation of an encoded scramble key, at 402. For example, the ECC engine 132 may receive the codeword representation 210 from the memory 104. The codeword representation 210 may include the representation of the header 212, the representation of scrambled data 214, and the representation of ECC parity bits 216. The representation of the header 212 may include the representation of an encoded scramble key 218.

The representation of the encoded scramble key is decoded to produce a scramble key, at 404. For example, the scramble key decoder 236 may decode a copy of the representation of the encoded scramble key 218 received from the memory 104 to produce the scramble key 239. For example, the scramble key decoder 236 may apply a Hamming code to decode the representation of the encoded scramble key 218. As another example, the scramble key decoder 236 may decode the representation of the encoded scramble key 218 using parity bits according to a mini-ECC scheme. As a further example, the scramble key decoder 236 may decode the representation of the encoded scramble key 218 via a repetition encoding using a voting scheme, such as a majority voting scheme.

The representation of scrambled data is descrambled based on the scramble key to produce a descrambled representation of data, at 406. For example, the descrambler 240 may receive the representation of scrambled data 214 from the memory 104 and the scramble key 239 from the scramble key decoder 236, load the scramble key 239 to the LFSR 241, and cycle resulting data through the LFSR 241 to produce a pseudo-random scrambling word. The exclusive OR 238 of the representation of scrambled data 214 and the pseudo-random scrambling word may be used to generate the descrambled representation of data 243. The descrambled representation of data 243 may be written to the RAM 234.

The descrambled representation of data and the scramble key are decoded using an error correction code decoder to produce decoded data, at 408. For example, the ECC engine 132 may receive the codeword representation 210 from the memory 104 and decode the representation of the header 212 including the encoded scramble key 218, the representation of the scrambled data 214, and the representation of the ECC parity bits 216 to produce the error location data 233. The error location data 233 is provided to the RAM 234 to correct (e.g., "flip") bits in those locations such that error correction is performed in the RAM 234. The error location data 233 may be applied to the descrambled representation of data 243 written to the RAM 234 to produce decoded data including an unscrambled, error corrected version of data 242 and an error corrected version of a header 244 including a scramble key.

By decoding the scramble key 239 independent of the scrambled data 214, latency during a data read operation may be reduced. For example, rather than serially performing ECC decoding and then descrambling using the error corrected key, descrambling and ECC decoding may be performed at least partially in parallel. When the scramble key 239 is "correct", a number of transfers of data into and out of the RAM 234 may be reduced, which may reduce latency in providing requested data. For example, the scramble key decoder 236 may be configured to achieve a statistical likelihood of success based at least in part on factors such as a strength of an encoding scheme, a length of the scramble key 239, an estimated probability of bit errors, or any combination thereof.

Although the encoded scramble key 146 is illustrated in FIG. 1 as being stored with the scrambled data 142, in other embodiments the encoded scramble key 146 may not be stored with the scrambled data 142. For example, the encoded scramble key 146 may be stored in a same word line of a NAND flash memory as the scrambled data 142 but in a location that is non-adjacent to the scrambled data 142 in the word line, such as in a word line header area that may be read with the scrambled data 142 in a single read operation and recombined with the scrambled data 142 to form the codeword representation 210 of FIG. 2 for decoding. As another example, the encoded scramble key 146 may be stored in a different word line than the scrambled data 142, such as in a dedicated encoded scramble key storage area of the memory 104.

Although various components depicted herein are illustrated as block components and described in general terms, such components may include one or more microprocessors, state machines, or other circuits configured to enable the scramble key encoder 136 of FIG. 1 to separately encode the scramble key 139 for storage with the scrambled data 142.

For example, the scramble key encoder 136 may represent physical components, such as hardware controllers, state machines, logic circuits, or other structures, to enable the scramble key encoder 136 to separately encode the scramble key 139 for storage with the scrambled data 142.

In a particular embodiment, the data storage device 102 may be implemented in a portable device configured to be selectively coupled to one or more external devices. However, in other embodiments, the data storage device 102 may be attached or embedded within one or more host devices, such as within a housing of a host communication device. For example, the data storage device 102 may be within a packaged apparatus such as a wireless telephone, a personal digital assistant (PDA), a gaming device or console, a portable navigation device, or other device that uses internal non-volatile memory. In a particular embodiment, the data storage device 102 may be coupled to a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   in a data storage device including a non-volatile memory, performing:
   scrambling data using a scramble key to produce scrambled data;
   encoding, independent of the data, the scramble key to produce an encoded scramble key that includes a set of parity bits;
   encoding the encoded scramble key and the scrambled data to produce a codeword, the codeword including the encoded scramble key, the scrambled data, and parity data, the set of parity bits includes a fewer number of bits than the parity data; and
   storing the codeword to the non-volatile memory.

2. The method of claim 1, further comprising:
   scrambling second data using a second scramble key to produce second scramble data, the second scramble key distinct from the scramble key;
   encoding the second scramble key to produce a second encoded scramble key; and
   storing the second encoded scramble key and the second scrambled data to the non-volatile memory, wherein the codeword is stored at a first logical page of a physical page of the non-volatile memory, and wherein the second encoded scramble key and the second scrambled data are stored at a second logical page of the physical page.

3. The method of claim 1, wherein storing the codeword comprises storing the encoded scramble key to a first wordline of the non-volatile memory and storing the scrambled data to a second wordline of the non-volatile memory, wherein the first wordline is different from the second wordline.

4. The method of claim 1, wherein encoding the scramble key comprises applying repetition encoding to produce the encoded scramble key, and wherein the repetition encoding enables error correction using a voting scheme.

5. The method of claim 1, wherein the scramble key is encoded using an error correction code (ECC) encoder, wherein the ECC encoder generates the set of parity bits, and wherein the encoded scramble key comprises the scramble key and the set of parity bits.

6. The method of claim 1, wherein the parity data comprises a second set of parity bits that correspond to the encoded scramble key and the scrambled data, and wherein the non-volatile memory comprises a flash memory.

7. The method of claim 1, wherein storing the codeword comprises programming the codeword to a physical page of the non-volatile memory.

8. A data storage device comprising:
a non-volatile memory; and
a controller configured to:
scramble data using a scramble key to produce scrambled data;
encode, independent of the data, the scramble key to produce an encoded scramble key that includes a greater number of bits than the scramble key;
encode the encoded scramble key and the scrambled data to produce a codeword, the codeword including the encoded scramble key, the scrambled data, and parity data; and
store the codeword to the non-volatile memory.

9. The data storage device of claim 8, further comprising a scramble key generator configured to produce the scramble key, wherein the encoded scramble key is pre-pended to the scrambled data to produced combined data, and wherein the combined data is encoded to produce the codeword.

10. The data storage device of claim 8, wherein the controller includes a scramble key encoder configured to encode the scramble key.

11. The data storage device of claim 10, wherein the scramble key encoder is configured to encode the scramble key using a Hamming code, using repetition encoding, or using an error correction code (ECC) encoder, wherein the encoded scramble key is decodable independent of the data and independent of the scrambled data.

12. The data storage device of claim 10, wherein the scramble key encoder includes a first error correction code (ECC) encoder configured to generate a first set of parity bits to encode the scramble key, and wherein the encoded scramble key includes the scramble key and the first set of parity bits.

13. The data storage device of claim 12, further comprising a second ECC encoder configured to generate the codeword, wherein the second ECC encoder is configured to encode the encoded scramble key and the scrambled data to generate the parity data, the parity data including a second set of parity bits, wherein the first ECC encoder is distinct from the second ECC encoder.

14. The data storage device of claim 8, wherein the controller includes an error correction code (ECC) encoder configured to produce the codeword.

15. The data storage device of claim 8, wherein the encoded scramble key includes a first set of parity bits, and wherein the first set of parity bits includes a fewer number of bits than the parity data.

16. A method comprising:
in a data storage device including a non-volatile memory, performing:
receiving data including a representation of scrambled data and a representation of an encoded scramble key;
decoding the representation of the encoded scramble key to produce a scramble key;
descrambling the representation of scrambled data based on the scramble key to produce a descrambled representation of data; and
applying error location data from an error correction code (ECC) decoder to the descrambled representation of data and to the scramble key to produce corrected data.

17. The method of claim 16, wherein the representation of the encoded scramble key is decoded using a Hamming code, a voting scheme, or parity bits.

18. The method of claim 16, further comprising initiating a read operation of a wordline of the non-volatile memory, wherein the representation of the encoded scrambled key is stored at the wordline.

19. The method of claim 18, wherein the scrambled data is stored at the wordline.

20. The method of claim 18, wherein receiving the data includes receiving a representation of a codeword that includes the representation of the encoded scramble key, the representation of the scrambled data, and a representation of parity data, and further comprising decoding the representation of the codeword to generate the error location data.

21. The method of claim 18, further comprising initiating a second read operation of a second wordline of the non-volatile memory, wherein the representation of the scrambled data is stored at the second wordline.

22. The method of claim 16, wherein the corrected data includes an ECC corrected scramble key and ECC corrected data, and further comprising:
comparing the ECC corrected scramble key to the scramble key to produce a comparison result;
scrambling the ECC corrected data using the scramble key to produced scrambled corrected data; and
descrambling the scrambled corrected data using the ECC corrected scramble key.

23. A data storage device comprising:
a non-volatile memory; and
a controller configured to:
receive, from the non-volatile memory, data including a representation of scrambled data and a representation of an encoded scramble key;
decode the representation of the encoded scramble key to produce a scramble key;
descramble the representation of scrambled data based on the scramble key to produce a descrambled representation of data; and
apply error location data from an error correction code (ECC) decoder to the descrambled representation of data and to the scramble key to produce corrected data.

24. The data storage device of claim 23, wherein the controller includes a scramble key decoder configured to decode the representation of the encoded scramble key independent of the representation of the scrambled data to produce the scramble key.

25. The data storage device of claim 23, wherein the representation of the encoded scramble key includes a representation of a first set of parity bits, and wherein the data further includes a representation of a second set of parity bits that is distinct from the first set of parity bits.

26. The data storage device of claim 23, further comprising:
   the ECC decoder configured to decode the data to produce the error location data; and
   a second ECC decoder configured to decode the representation of the encoded scramble key to produce the scramble key, wherein the ECC decoder is distinct from the second ECC decoder.

27. The data storage device of claim 26, wherein the data further includes a representation of parity data, and wherein the non-volatile memory comprises a flash memory.

28. The data storage device of claim 23, wherein the corrected data includes an ECC corrected scramble key and ECC corrected data.

29. The data storage device of claim 28, further comprising scrambling control logic configured to:
   compare the ECC corrected scramble key to the scramble key to produce a comparison result;
   scramble the ECC corrected data using the scramble key to produced scrambled corrected data; and
   descramble the scrambled corrected data using the ECC corrected scramble key.

* * * * *